United States Patent [19]

Demazier et al.

[11] Patent Number: 4,949,285
[45] Date of Patent: Aug. 14, 1990

[54] MULTICHANNEL RECORDER FOR EQUIDISTANT RECORDING OF SIGNIFICANT CHANGES OF A MEASURED VARIABLE IN EACH CHANNEL

[75] Inventors: Pierre Demazier, Corbie; Yves Gallet, Montigny; Christine Gambier, Douvai, all of France

[73] Assignee: Honeywell SA, France

[21] Appl. No.: 230,739

[22] Filed: Aug. 5, 1988

Related U.S. Application Data

[63] Continuation of Ser. No. 916,983, Oct. 9, 1986, abandoned, which is a continuation of Ser. No. 667,178, Nov. 11, 1984, abandoned.

[30] Foreign Application Priority Data

Nov. 8, 1983 [DE] Fed. Rep. of Germany ....... 3340306

[51] Int. Cl.$^5$ .............................................. G06F 3/12
[52] U.S. Cl. .................................... 364/520; 364/900; 364/929.3; 346/34
[58] Field of Search ... 364/200 MS File, 900 MS File, 364/518, 520; 346/34, 101

[56] References Cited

U.S. PATENT DOCUMENTS

| 3,665,414 | 5/1972 | Hutch et al. | 346/34 |
| 4,074,273 | 2/1978 | Dupree et al. | 346/34 |
| 4,156,930 | 5/1979 | McClenahan et al. | 346/34 |
| 4,433,338 | 2/1984 | Nakagawa et al. | 346/34 |

FOREIGN PATENT DOCUMENTS

| 3318714 | 11/1984 | Fed. Rep. of Germany | 346/34 |
| 2389102 | 12/1978 | France | 346/34 |
| 0023957 | 2/1977 | Japan | 346/35 |
| 0613200 | 6/1978 | U.S.S.R. | 346/34 |
| 1301292 | 12/1972 | United Kingdom | 346/64 |

Primary Examiner—Lawrence E. Anderson
Attorney, Agent, or Firm—Mitchell J. Halista; Albin Medved

[57] ABSTRACT

An apparatus for recording a plurality of variable analog signals individually and sequentially scanned during the recording operation. The analog signals are digitized, and the digital values multiplexed into a microprocessor which uses a stored program to determine significant changes in the scanned analog input and to store only meaningful data representing a significantly changed analog input in a buffer memory for subsequent recording on a recording chart. Specifically, the apparatus provides a selection of input values to be recorded whereat the recorded input values differ by a predetermined amount with respect to the measured value or the time basis of a recording chart. The buffer memory serves to match the velocities between scanning of the inputs and the printing of the measured variables since the inputs are scanned at a rate which is much higher than the print rate of the recorder to allow a follow-up of the measured variable which provides equidistant recording of the measured values.

7 Claims, 4 Drawing Sheets

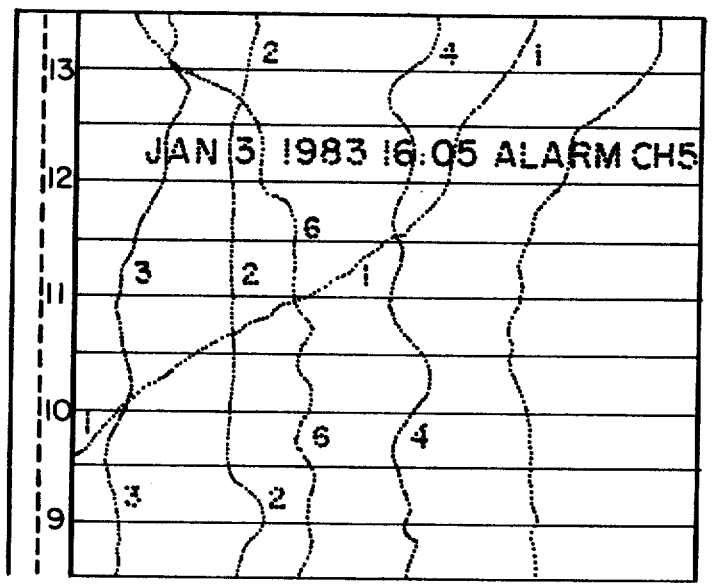
F I G. 6

MULTICHANNEL RECORDER FOR EQUIDISTANT RECORDING OF SIGNIFICANT CHANGES OF A MEASURED VARIABLE IN EACH CHANNEL

This application is a continuation of application Ser. No. 06/916,983, filed Oct. 9, 1986, now abandoned, which is a continuation of application Ser. No. 06/667,178, filed Nov. 1, 1984, now abandoned.

BACKGROUND OF THE INVENTION

1. Field of the Invention

The present invention relates to recorders. More specifically, the present invention is directed to multipoint recorders for recording a plurality of variables.

2. Description of the Prior Art

In known multichannel recorders the rate with which the variable signal points within the individual measuring channels are scanned is matched to the printing velocity of the print head, i.e., the scanning rate is synchronized with the print rate This results in good readable point diagrams on a chart as long as the measured value with respect to time does not show significant changes. If such significant changes appear, the recorded point diagram becomes very incomplete by failing to record all of the significant changes. The incomplete recording of the printed point diagrams is due to the fact that with constant feed velocity of the chart the print rate of the recorder also remains constant with the print rate being determined by the scanning rate. However, it would be desirable to achieve a more complete and readable record of the variable signals within the individual channels.

SUMMARY OF THE INVENTION

An object of the present invention is to provide an improved multichannel point recorder by which in each event a substantially complete and readable curve is recorded, whereat only meaningful values of the measured variables which are equidistant from each other are selected and recorded.

In accomplishing these and other objects, there has been provided, in accordance with the present invention, a multichannel recorder, whereat per channel the measured input values are cyclically scanned and said scanned values serve to drive and control a print head being displaceable transversely across a movable recording chart forming a time base with respect to the measured value by memorizing for each channel the data with respect to the measured value and the time base of the last printed point ($P_n$), first testing whether a newly measured value ($P_{n+1}$) differs from the last measured and printed value ($P_n$) by an amount k ($|P_n - P_{n+1}| \geq k$), and in the event where this test is satisfied, memorizing said newly measured value ($P_{n+1}$) together with its time base ($\Sigma a$), and in the event where this test is not satisfied secondly testing whether the time base ($\Sigma a$) exceeds a certain amount ($\Sigma a \geq k$), and in the event where the second test is satisfied memorizing the newly measured value ($P_{n+1}$) together with said time base ($\Sigma a$), and in the event where the second test also is not satisfied, cycling to the next channel and making the same tests with a subsequent recording of the stored values. An apparatus for implementing the invention includes a discriminator means arranged between a multiplex scanning device (14) and a buffer memory and evaluating at each scanning cycle whether the difference between the last memorized value and the presently scanned value is equal or greater than a given constant (k) or, if this is not the case, whether the summed displacement of the recording chart is equal or greater than said constant (k).

BRIEF DESCRIPTION OF THE DRAWINGS

A better understanding of the present invention may be had when the following description is read in connection with the accompanying drawings, in which:

FIG. 6 shows a further example of a diagram achievable with the point recorder shown in FIG. 3.

DESCRIPTION OF THE PREFERRED EMBODIMENT

Figure 1:
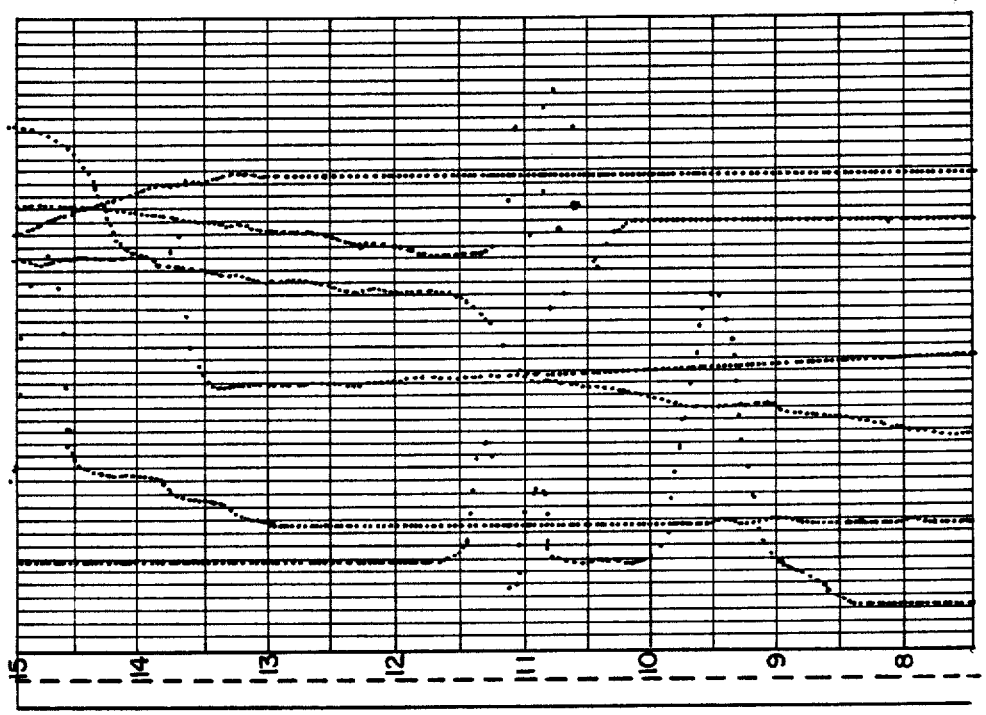
FIG. 1 shows a diagram for the process variables of several channels recorded on a chart by a conventional recorder.
Figure 2:
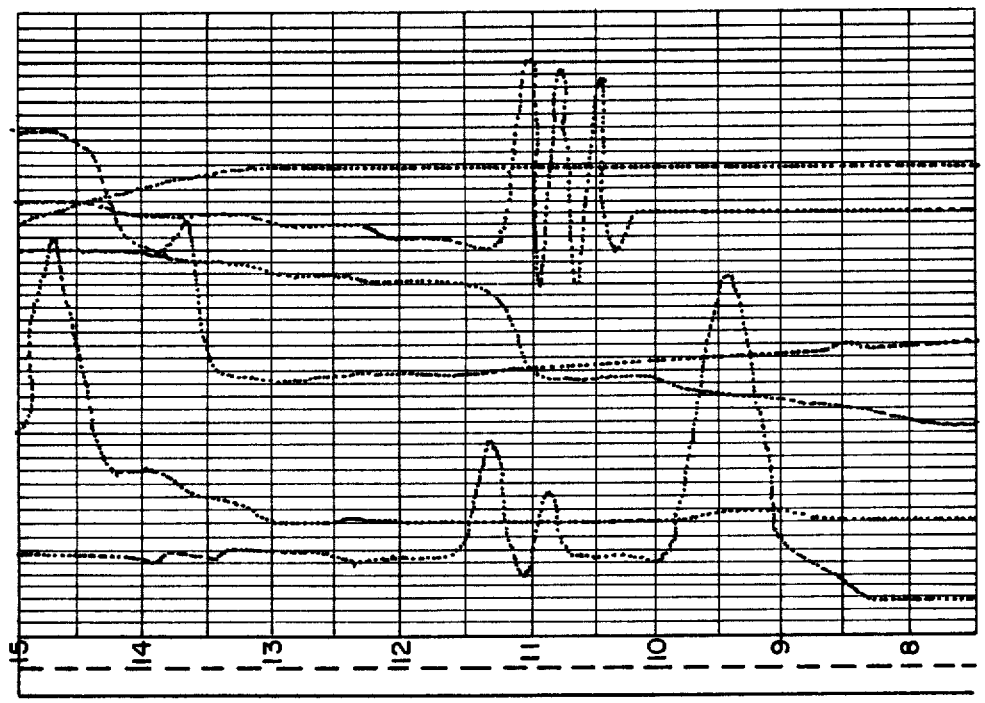
FIG. 2 shows the same type of diagram as achieved by a point recorder, according to the present invention.
Figure 3:
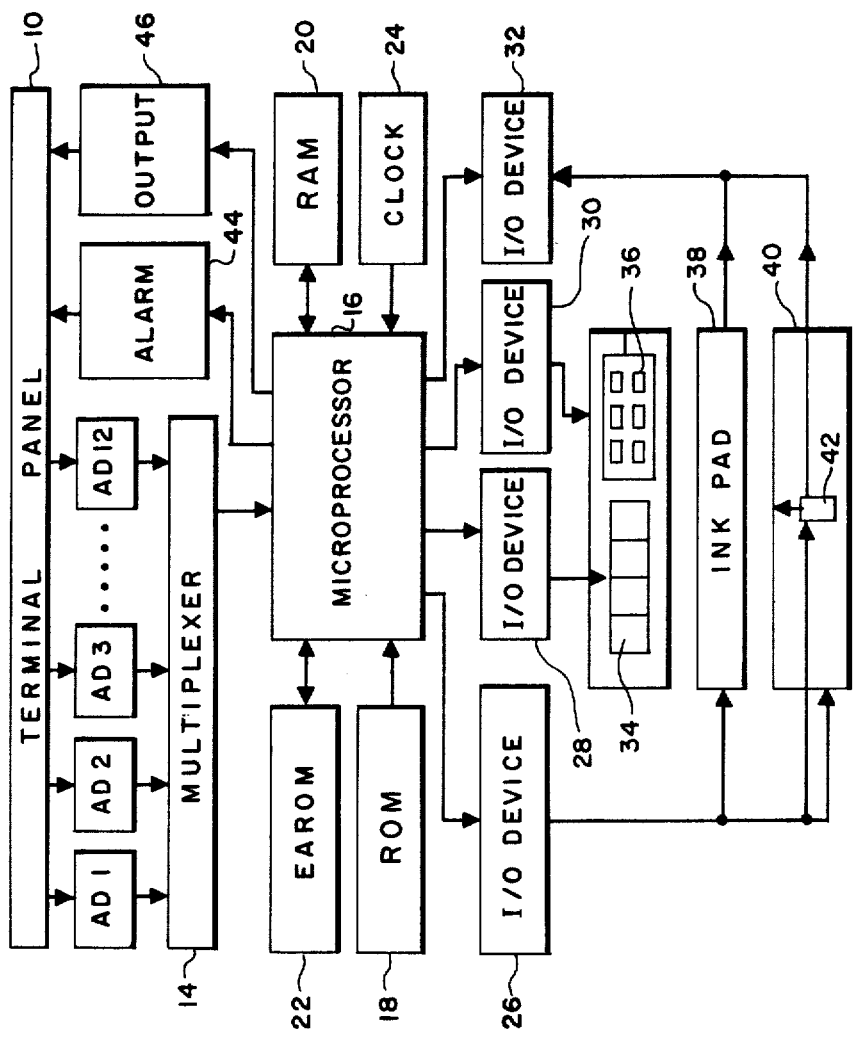
FIG. 3 shows a block diagram of the multichannel point recorder embodying an example of the present invention.

For achieving a more complete record of a process variable according to FIG. 2 as contrasted with the incomplete record shown in FIG. 1, the multichannel point recorder is used as shown in FIG. 3. By means of a terminal panel 10 the recorder is connected to receive analog input signals from different channels CH1 to CH12 in any suitable well-known manner which is not further shown. A plurality of analog/digital converters AD1 to AD12 serve to convert respective ones of the measured analog input values into digital values, and at the same time they serve as signal isolation means. A multiplexer 14 sequentially scans the converted digital values and feeds those values to a microprocessor 16 for further processing. The microprocessor 16 is operated by instructions of a program which is stored in a read-only-memory, e g., ROM 18. Intermediate digital values of the input signals and values of the input signals to be printed are stored in a random-access-memory, e.g., RAM 20 which at the same time serves as a buffer memory. An electrically alterable read-only-memory, e.g., EAROM 22, serves as a nonvolatile memory for the storage of operational parameters of the recorder, e.g., a programmed velocity v of the chart.

A clock unit 24 provides clock signals for synchronizing calculations and the scanning of data inputs and outputs. Different input/output devices 26, 28, 30 and 32 serve to drive different recorder motors to record, for instance the input process variables, set points and feedback signals, e g., from position indicators connected to the recorder motors. The I/O devices 28 and 30 preferably are connected to a display unit 34 and to a keyboard 36, respectively. The I/O device 26 controls three recording step motors which are not shown, e.g., the first step motor steps a recording ink pad barrel 38, the second step motor drives a recording chart 40 and the third step motor moves a printing head 42 transversely to direction of movement of the chart 40. An alarm unit 44 and an output unit 46 are provided through which the microprocessor 16 may provide alarm signals to associated devices to the outside world and may communicate with a central data processing device, respectively.

Figure 4:
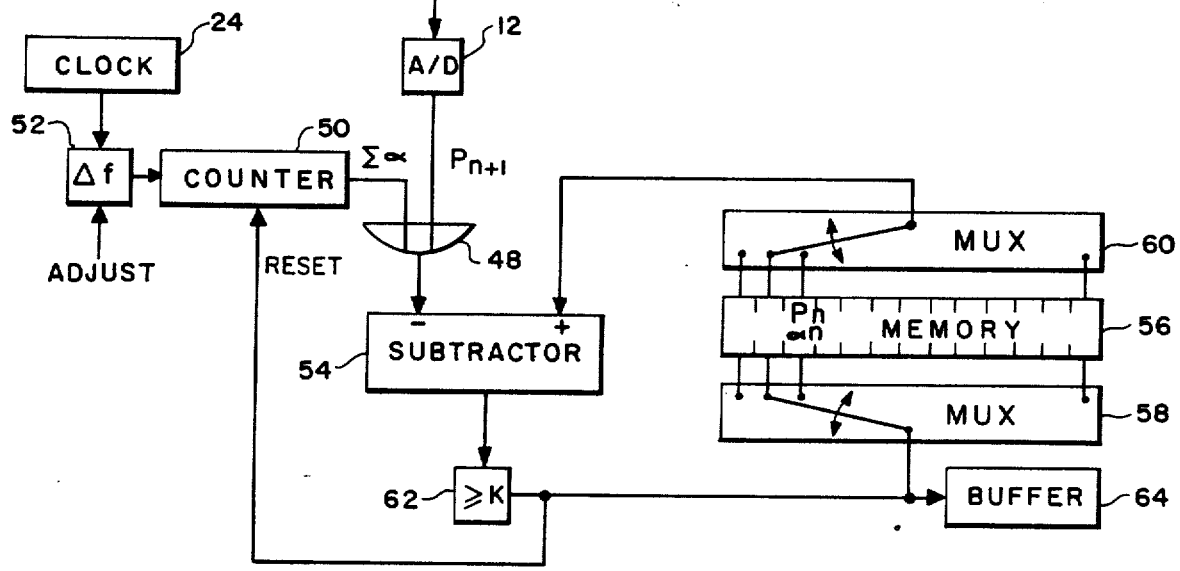
FIG. 4 shows a block diagram of an example of hardware for implementing the present inventive method.

FIG. 4 shows an example of a hardware configuration implementing the present novel method for enabling the selection of the input data to be memorized and to be printed per measuring channel. The measuring channels CH1 to CH12 are cyclically individually connected by means of the multiplexer 14 to an analog/digital converter 12. The output of the analog/digital converter 12 is connected to one input of an OR-gate 48. The other input of the OR-gate 48 is connected to the output of a counter 50 which is used to sum up the displacement steps of the stepping motor (not shown) driving the recording chart. To this end the counter 50 is fed by the clock unit 24 via an adjustable frequency divider 52. By means of the frequency divider 52 the desired chart velocity represented by the clock may be adjusted, and the counter 50 may be preset in such a way that at its overflow it has summed up a number of steps of the stepping motor corresponding to a predetermined amount.

The output of the OR-gate 48 is connected to the (−)-input of a subtracting device 54. The (+)-input of the subtracting device 54 is connected to an output of a scratch pad memory 56 which stores per measuring channel meaningful data $P_n$, $\alpha_n$ of a former input scanning cycle. The inputs and outputs of the scratch pad memory 56 by means of multiplexing switches 58 and 60, which are actuated synchronously with the measuring channel multiplexer 14, are concurrently connected to a threshold detector 62 and to the (+)-input of the subtracting device 54. The threshold detector 62 is also connected to the input of a FIFO-buffer 64 so that each time new data is written into the scratch pad memory 56 this new data is also written into the FIFO-buffer 64 which functions as the buffer memory 20 shown in FIG. 3.

Figure 5:
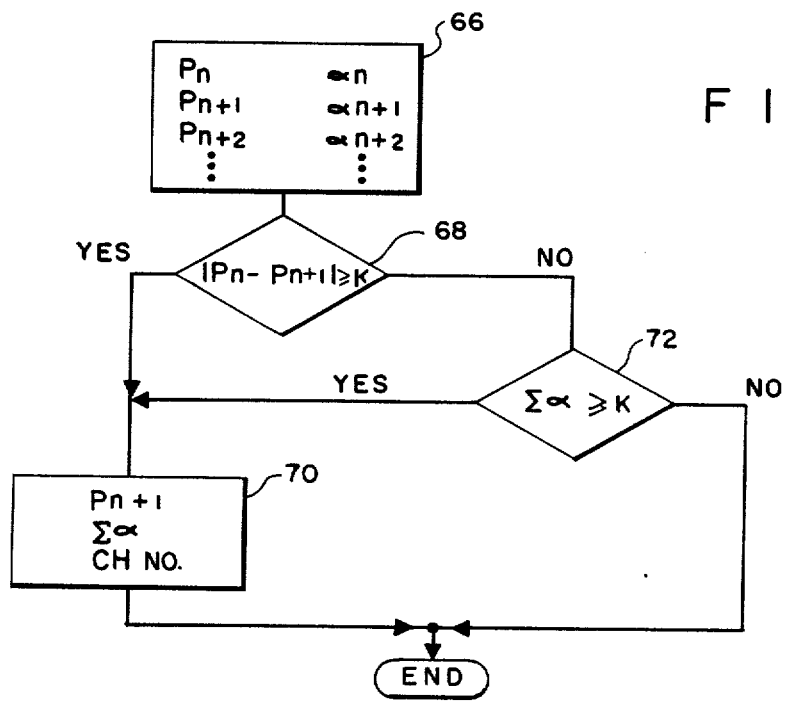
FIG. 5 shows a flow chart suitable for implementing the present inventive method.

FIG. 5 shows in a flow chart the method steps for receiving the data to be memorized and to be printed. At any point of time of scanning of the process variable per channel a measured value $P_n$ is memorized and departing from this measured value the number of chart motor steps $\alpha$ is computed. The number of steps $\alpha$ depends on the adjusted velocity v of the chart and on the step displacement L given by the mechanical parameters of the recorder. At the following scanning of the same channel, the value $P_{n+1}$ is measured, and the number of chart motor steps equals $\alpha_{n+1}$ or $\Sigma\alpha$, respectively, if one takes into account that the motor steps are consecutively summed up. The values P and $\alpha$ are given in a first step block 66. In a first decision block 68 wherein the question is whether the absolute value of the difference between the measured value $P_n$ scanned in a preceding measuring cycle and the measuring value $P_{n+1}$ scanned in the present scanning cycle equals k or is greater than k, whereat k corresponds to the distance between two points to be printed. For example, a typical k is 0.5 mm. If this question is answered by "yes", then in a next step block 70 the new measured value $P_{n+1}$ together with the number of chart motor steps $\Sigma\alpha$ and the channel number are memorized.

If the question is answered by "no", then in a second decision block 72 the question is whether the number of the summed up chart motor steps equals k or is greater than k, whereat k again corresponds to the same previously used value. If the answer is "yes", then the number of summed up chart motor steps $\alpha$ together with the measured value and the corresponding channel number is memorized by the step 70. If both decisions are answered by "no", the present scanning cycle proceeds to the next input channel, and the same tests are made with respect to this next channel.

In the following scanning cycle the same questions are asked, whereat now the newly scanned measured value $P_{n+2}$ and the meanwhile increased number of chart motor steps $\Sigma\alpha$ are compared to k. Obviously, after a sequence of scanning cycles in each event one of both conditions is fulfilled, and the corresponding measured value together with the number of chart motor steps is memorized. If the input scanning rate is chosen high enough, one of both conditions may be fulfilled after a certain number of scanning cycles. In any case, the memory 20 is filled only with meaningful data since the aforesaid chosen selection criterion prevents the condition that per scanning cycle all scanned measured values are memorized. The rejection of nonmeaningful values by means of the selecting circuit saves recording paper and ink, and by means of the novel method a long conventional graph may be concentrated in a short length graph.

The provision of the random-access-memory RAM 20 together with the read-only-memory ROM 18 and the programs included therein together with the microprocessor 16 allows an advantageous implementation of further functions. For instance, it is possible to write the numbers 1, 2, 3 ... of the individual channels adjacent to the recorded graphs.

This may be done by the recorder in a color corresponding to the color of the related channel Whereas the number indications as shown in FIG. 6 are made under regular spaces, e.g., when exceeding a given limit value, they may be logged with date and time of occurrence, and may follow a printout of the memorized last values of the process variable with respect to the channel in which the limit value has been exceeded. It should be further understood that a scale switching may be used in the event where the values of a process variable would exceed the width of the recording chart. The corresponding scale factor may also be printed out.

Finally, it is possible by means of a special program to characterize further channels by a sequence of points with said sequence being combined from present colors. The number of basic colors is limited, and normally the ink pad barrel 38 is designed to have six different colored ink pads. However, if there is to be recorded the process variables of more than six channels, e.g., twelve input channels, some channel recordings can be characterized by respective combination of the basic six colors, e.g., two blue points are followed by a red point.

Accordingly, it may be seen, that there has been provided, in accordance with the present invention, an improved multichannel recorder.

The embodiment of the invention in which an exclusive property or privilege is claimed are defined as follows:

1. A multichannel point recorder comprising
multiplex scanning means for sequentially scanning a plurality of input measured variables;
memory means for storing values applied thereof and for supply stored values as memory output signals,
recording chart means including a recording chart and drive means arranged to effect a longitudinal displacement of the chart with respect to time;
a recording head displaceable transversely across the chart for recording on the chart;

discriminator means arranged between said multiplex scanning means and said memory means for evaluating for each measured variable at each scanning cycle of said scanning means whether the difference between the last value of said measured variable stored in said memory means and the presently scanned value is equal to or greater than a given constant representing a distance between two printing points on the recording chart by said recording head and, if not, whether the summed displacement of the recording chart is equal to or greater than said constant with a subsequent storage in said memory means of the value of measured variable and the recording chart displacement meeting at least one of said evaluations and recording head control means under control of the stored data in said memory means to record by said recording head the values of said measured variables stored in said memory means.

2. An apparatus according to claim 1, characterized in that said discriminator means comprises a subtracting device and a threshold device.

3. An apparatus according to claim 2, characterized in that said threshold device is connected with its output to said memory means and to a scratch pad memory.

4. An apparatus according to claim 3, characterized in that said multiplex scanning device and a counter summing up the recording chart displacement are connected via an OR-gate to one input of said subtracting device.

5. An apparatus according to claim 4, characterized in that another input of the subtracting calculating device is connected to the output of the scratch pad memory.

6. An apparatus according to claim 4, characterized in that said counter is controlled by a clock unit by means of an adjustable frequency divider and is resettable by the output signal of the threshold device.

7. An apparatus according to claim 1, characterized in that said discriminator means comprises a microprocessor for implementing the evaluations.

* * * * *